United States Patent [19]

Roberts

[11] Patent Number: 4,739,697
[45] Date of Patent: Apr. 26, 1988

[54] BREW CHAMBER WITH FILTER SPACER

[75] Inventor: Melvin F. Roberts, Niles, Ill.

[73] Assignee: Bloomfield Industries, Inc., Chicago, Ill.

[21] Appl. No.: 46,299

[22] Filed: May 4, 1987

[51] Int. Cl.$^4$ .............................................. A47J 31/02
[52] U.S. Cl. ...................................... 99/295; 99/306; 210/474
[58] Field of Search ................. 99/295, 306, 304, 307, 99/300, 301, 302 R, 279; 210/473, 474; 426/433

[56] References Cited

U.S. PATENT DOCUMENTS

| | | | |
|---|---|---|---|
| 2,496,757 | 2/1950 | Sieling | 210/474 |
| 2,885,290 | 5/1959 | Krasker | 99/306 |
| 3,356,010 | 12/1967 | Eisendrath | 99/304 |
| 3,374,897 | 3/1968 | Martin | 99/304 |
| 3,450,024 | 6/1969 | Martin | 99/295 |
| 3,479,949 | 11/1969 | Reynolds | 99/295 |
| 4,621,571 | 11/1986 | Roberts | 99/280 |

Primary Examiner—Robert W. Jenkins
Attorney, Agent, or Firm—Lee, Smith & Zickert

[57] ABSTRACT

An improved brew chamber with filter spacer and support frame for use in an electric coffeemaker. The support frame being resiliently engagable within said brew chamber to be spaced from the chamber bottom whereby filter paper may be received within said brew chamber for receipt therein of a load of fresh ground coffee. During receipt of hot brewing water the filter paper is spaced above the bottom of the brew chamber and is prevented from sagging and clogging the brew chamber so that extracted coffee freely flows through said filter paper and outwardly of the brew chamber through an outlet orifice. The brew chamber and support frame are made of stainless steel and are resiliently engagable whereby used coffee grounds and filter paper may be discarded therefrom without accidental disengagement of the support frame.

20 Claims, 2 Drawing Sheets

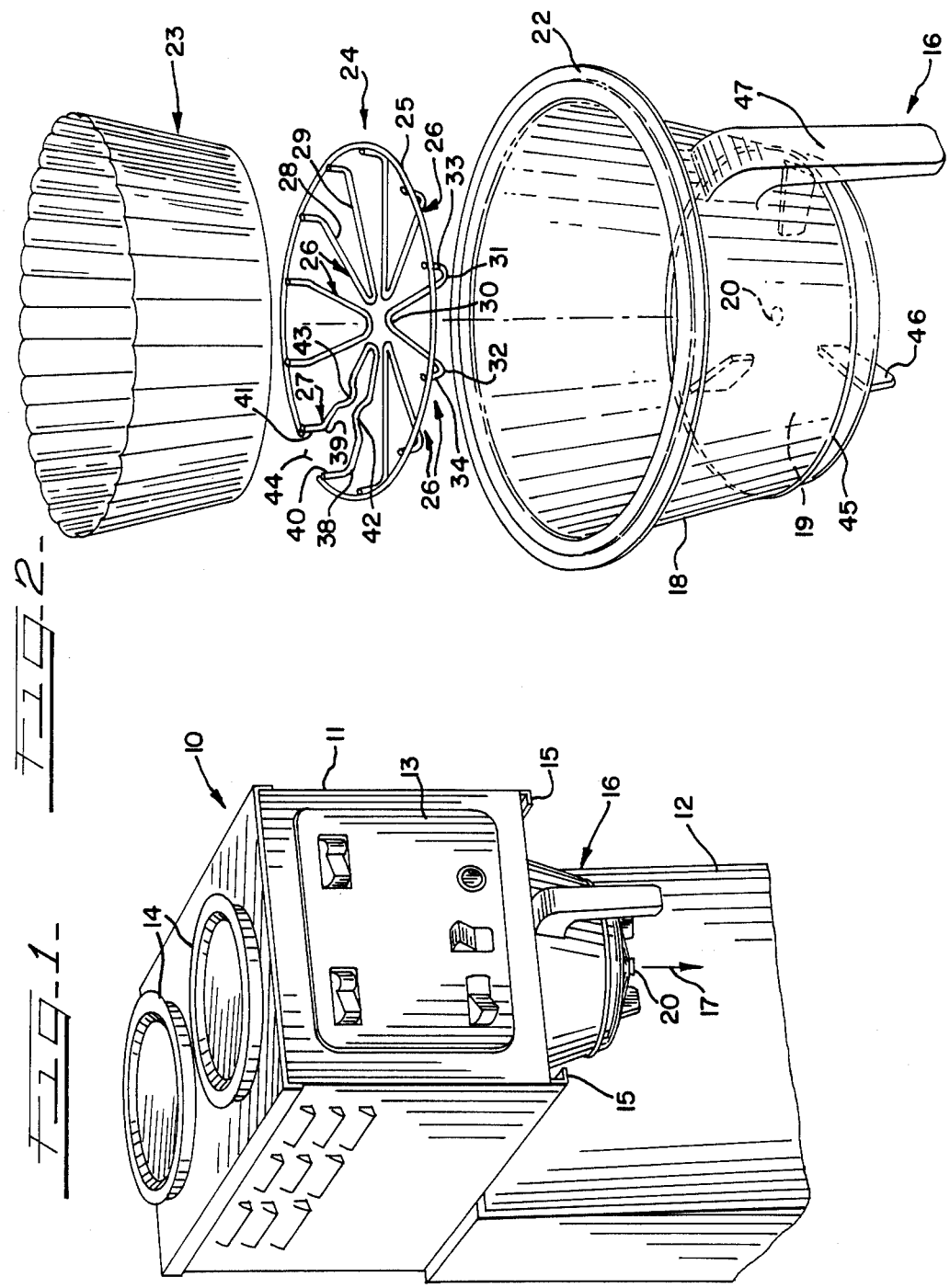

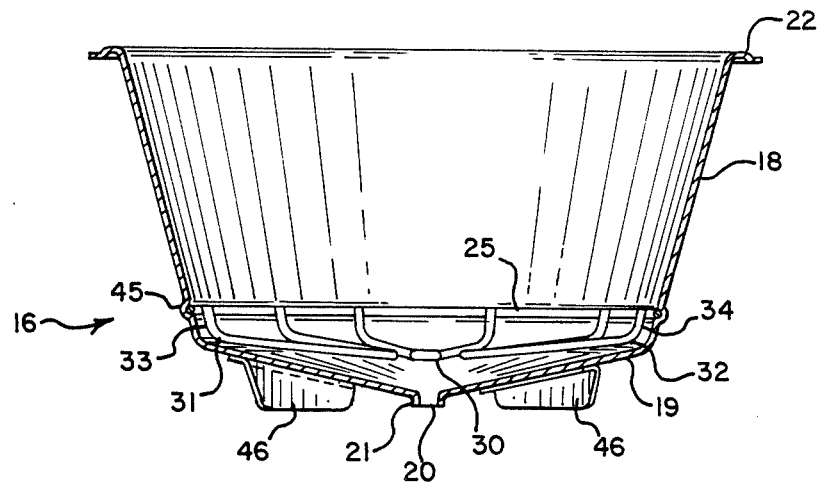
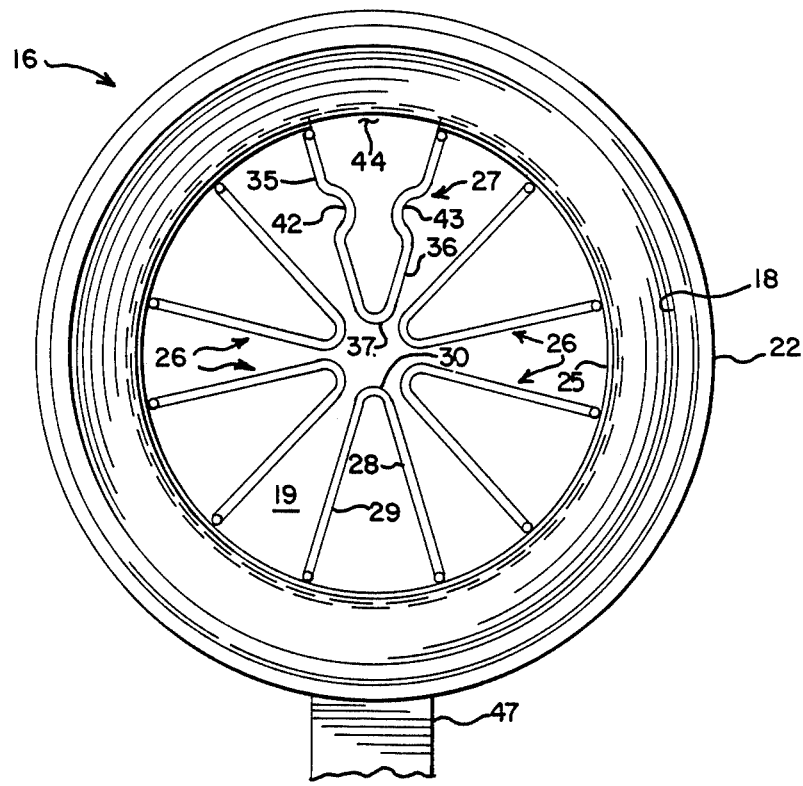

BREW CHAMBER WITH FILTER SPACER

BACKGROUND OF THE INVENTION

The invention relates to an improvement to brew chambers used to hold ground coffee beans within a filter paper ready to receive hot brewing water for brewing coffee and draining it to a decanter.

The invention is particularly directed to both automatic and pour over coffee devices wherein a brew chamber is supported by an upper housing of the coffeemaker directly below the outlet of a siphon tube that conveys hot water from a heated tank within the device. These siphon-type coffeemakers are found both in homes and public restaurants.

Usually, the brew chamber has a frusto-conical shape having an open top with a rim around the upper edge. The rim serves to slide within a pair of opposing guide slots on the coffeemaker housing for holding the chamber. The brew chamber will also usually have a sump in the bottom wall with an outlet orifice, through which the brewed coffee drains into a decanter below.

At one side of the brew chamber there is typically a handle grip for maneuvering the brew chamber. When a batch of coffee is desired the handle may be grasped and the brew chamber slid outwardly of the guide slots away from the device. Thereafter, a complementarily-shaped filter paper is placed into the brew chamber and the appropriate amount of a blend of ground coffee beans is placed onto the filter paper. Then, the brew chamber is returned below the siphon opening of the coffeemaker by sliding the edge rim into the opposing channels or slots for supporting the brew chamber.

So that during brewing the coffee grounds do not clog the outlet orifice and cause the brewing coffee to overflow, it has been found to be necessary to support the filter paper above the bottom wall of the brew chamber so that a constant even flow is created for the brewed coffee leaving the coffee grounds. It has been found important to provide means for spacing the filter paper at a certain spacing above the bottom of the brew chamber so that a smooth flow of brewed coffee occurs below the filter paper to drain outwardly from the outlet orifice of the brew chamber.

In the past, the use of plastics for making brew chambers has become quite common. Since plastics are easy to mold into an infinite number of shapes, the spacing means for the filter paper has been provided by integrally molding with the brew chamber upwardly extending support ribs, tabs, and the like, capable of supporting the underside of the filter paper and spacing it away from the outlet orifice and bottom wall of the brew chamber. These molded supports satisfy the free flow drainage requirement and prevent clogging. One plastic quite commonly used to make brew chambers is polypropylene due to its heat resistance, durability and strength.

However, problems with plastic brew chambers have been encountered. One particular concern is the cleaning of the brew chamber once it has become stained with coffee. If plastic, such as polypropylene, is not cleaned on almost a daily basis in a restaurant, a dark staining may occur with the additional possibility of causing bad tasting coffee from residue left on the sidewall of the brew chamber. These problems are especially undesirable for restaurant coffeemakers, which establishments usually seek to serve good tasting coffee and also meet local health codes and other sanitary requirements.

An additional problem with plastic brew chambers is heat deformation that can be caused at the outlet orifice should someone inadvertently place the brew chamber on a warming plate for the decanter, or other hot surface. Sometimes, brew chambers are provided with downwardly molded legs which conveniently support the brew chamber in a level position when it is to be filled with a filter paper and fresh ground coffee. Legs are usually required because the bottom wall of the brew chamber is most often constructed to taper toward a sump and without legs the brew chamber would not be capable of resting in a level manner. The provision of legs can help somewhat to sapce the outlet orifice from a hot supporting surface below. The outlet orifice design for the brew chambers in the prior art alomost universally includes a downward projecting circumferential lip which assures that the outward flow of the brewed coffee is in a controlled steady stream rather than latching and randomly channeling on the bottom of the brew chamber adjacent the orifice. The design of a brew chamber preferably permits the outlet orifice to be as close as possible to the opening of the receiving decanter therebelow. Thus, even though support feet may be provided to allow the brew chamber to be poised upright and level on a surface for filling, the outlet orifice and depending lip are usually insubstantially the same plane of the bottom of the legs. Therefore, even though legs may be provided, the problem of heat deformation by placement on a hot plate or stove can still occur since the orifice would usually be close to the supporting surface for the legs.

Of course, unwanted deformation to integrally molded plastic base support legs themselves can also occur if the brew chamber is accidently placed on a hot surface.

The function of the lip depending around an outlet orifice is to create a nozzle-effect which is critical to an even flow rate of coffee. The outlet orifice is designed to have a certain diameter and a lip size that are calculated with respect to the size and shape of the brew chamber. Thus, if there is heat deformation changing the shape of the orifice, the outward flow may be restricted or altered so that the brewing coffee may clog the drain, become overextracted, or perhaps be underextracted by flowing too quickly from the brew chamber. Since many restaurants take great pride in the quality of coffee that they serve, the preservation of the intended designs of the orifice outlet and nozzle-like lip are critical to this end.

In further preventing the clogging of the outlet orifice, pleated filter papers are quite commonly provided which have sideward pleats on a tapered sidewall of the filter paper, which serve to space the filter paper from the complementarly sloped sidewall of the brew chamber. The bottom of standard filter paper is smooth and flat. The bottom is also generally circular having a diameter usually of about 4 to 6 inches for restaurant coffeemakers. The polypropylene brew chambers have require sometimes up to about 12 radial support ridges to surely support the bottom of this standard sized filter paper while holding fresh ground coffee that becomes heavily saturated with hot brewing water in order to prevent the paper from sagging downwardly to clog the outlet orifice. Accordingly, to achieve an effective spacing of the filter paper, the support ribs or flanges, must evenly and surely support the bottom surface of the filter paper without impeding an even flow of the brewing coffee passing through the filter paper to the outlet orifice.

It would be advantageous to make a brew chamber of stainless steel to take advantage of its excellent stain resistant properties and avoid the lingering bad taste and odor problems of plastic. A hurdle to the use of stainless steel is with providing a spacer means, also made of stainless steel, which spaces the filter paper from the bottom wall. The metal forming processes for related shapes made of stainless steel involve stamping techniques known to the metal working arts. The stamping procedure does not allow for forming integral spacer supports at the bottom of a stainless steel brew chamber unlike in the forming of thin flanges and other ridges for molded plastics. Since an effective spacer canot be integrally formed of stainless steel, a separate member is required. As a result, there are inherent problems in seeking to use stainless steel for providing a spacer support means that will fit within the brew chamber at an appropriate spacing and effectively function as a filter paper support to allow for a desired even flow from a stainless steel brew chamber.

By providing a separate spacer support member it is also a concern that after a batch of coffee is brewed, and the used grounds must be dispensed, a separate spacer element would not be accidentally thrown away into the refuse bin as the grounds are dumped. It is therefore an allied requirement to find a separate stainless steel filter support for spacing the filter paper from the bottom of the stainless steel brew chamber which is securely but removably attachable to the brew chamber so that firstly, the brew chamber may be emptied of its used load of coffee grounds and filter paper, and secondly, able to be removed for the cleaning of the support as well as the entire inner surface of the brew chamber.

A satisfactory stainless steel brew chamber and removable frame insert would also incorporate stainless steel foot supports at the outside bottom of the brew chamber whereby the brew chamber may stand level on a surface while a new filter paper is inserted and subsequent load of fresh coffee grounds deposited into it. The foot supports would also be required to support the lip of the outlet orifice sufficiently above the countertop, or table, on which the brew chamber would be placed in order to prevent bumping the lip and deforming the orifice shape and design. With stainless steel the problem of plastic heat deformation is eliminated.

The prsent invention solves all the foregoing problems and needs of the industry by eliminating the use of a plastic brew chamber by providing a stainless steel brew chamber and filter space support frame in satisfaction of those needs, as will be explained below.

SUMMARY OF THE INVENTION

The novel improved brew chamber with filter spacer may be summarized as providing a stainless steel shell-like chamber having tapering sidewalls that meet a bottom wall which slants to a sump. The sidewalls include annular groove means for the tight fit resilient engagement therearound of a filter paper support frame which serves to space an inserted filter paper from the bottom wall of the chamber. Thereby, the filter paper is effectively spaced at a pre-determined design spacing above an outlet orifice formed at the low point of the sump.

A filter paper may be placed atop the support frame and receive a fresh load of ground coffee. Thereafter, hot brewing water may be siphoned, or otherwise delivered, into the brew chamber, flow through the coffee grounds to extract the brewed coffee, and thereafter evenly flow through the filter paper toward the bottom wall of the brew chamber, outwardly via the outlet orifice, to then finally drain into a receiving decanter below.

To facilitate supportive engagement with a coffeemaker, an upper ring flange extends from the top of the brew chamber wall permitting the brew chamber to be supported at opposing channel-like flanges, or the like, of the coffeemaker housing wherein at generally opposite diametric locations on the upper ring flange the channel-like flanges support the brew chamber below a siphon outlet delivering hot water.

Stainless steel support feet are preferably provided and are affixed to the outer surface of the bottom wall so that the brew chamber may be supported in a level position for filing with fresh coffee and filter paper. The outlet orifice preferably includes a downward lip flange, or nozzle, creating a smooth stream flow of brewed coffee from the brew chamber. The support feet also serve to space the lip of the outlet orifice away from the supporting surface on which the brew chamber may reside to prevent deformation to the lip that might alter the fluid dynamics of the stream flow of the brewed coffee from the brew chamber.

The annular groove is netable with a shape-conforming discontinuous ring portion of a resilient spacer support frame which includes finger grip means for pinching and reducing the diameter in order to extract the support frame from the brew chamber. To install the support frame the finger grips are pinched to again reduce, or constrict, the diameter of the ring, so that by then releasing the finger grip means the support frame expands to tightly fit and nest within the annular groove. A plurality of generally V-shaped wire loops extend inwardly from the outer ring to create a support for the bottom of the filter paper to be rested thereon. One of the V-shaped loops spans a gap of the discontinuous ring portion. Radial arms of the one said V-shaped loop have opposingly convex portions forming the finger grip means whereby the support frame is made to be resiliently pinched and released to effectuate the resilient engagement with the annular groove in the sidewall of the brew chamber.

The arms of the V-shaped loops are further provided to have a short portion depending from the ring portion and a radial downwardly slanting portion extending therefrom, whereby the support frame tapers radially toward the central axis of the brew chamber. In preferred form the sump of the brew chamber is co-axially located below the support frame.

The support frame preferably also comprises stainless steel whereby to resist staining and provide for easy cleaning.

The sidewall of the brew chamber may be provided with engagable means for attachment of a handle so that the brew chamber may be easily removed from the coffeemaker and maneuvered so that the use coffee grounds may be dispensed and the brew chamber placed on a table, or service counter for filling with a fresh batch of ground coffee beans.

The inventive improved brew chamber with filter spacer support is capable of accomodating a filter paper with pleated sides which serve to space the filter paper from the sidewall of the brew chamber to prevent the paper from clinging to the sidewall and clogging th brew chamber. Thereby, the filter paper is spaced above the bottom wall of the brew chamber and from the sidewall so that the flow of hot brewing water is umimpeded. The coffee is thereby extracted to the appropriate degree and wherein the flow of brewed coffee through the filter paper moves past the spacer support frame to the sump of the brew chamber in a desired even flow.

BRIEF DESCRIPTION OF THE DRAWINGS

FIG. 1 is a perspective view of a portion of an automatic coffeemaker showing the inventive brew chamber, with filter spacer support frame, supported below an upper housing in fluid communication with a siphon delivering hot water to the brew chamber holding coffee grounds therein for brewing and draining to a decanter which can be placed below the brew chamber;

FIG. 2 is an exploded perspective view of the brew chamber of Fig. 1 showing the filter spacer support frame separated axially above the brew chamber and a filter paper axially separated above the support frame;

FIG. 3 is a central vertical sectional view of the brew chamber with the filter spacer support frame resiliently engaged therein; and, FIG. 4 is a top plan view of the brew chamber with filter spacer support frame engaged therein as shown in FIG. 3.

DETAILED DESCRIPTION OF THE PREFERRED EMBODIMENT

FIG. 1 is a perspective view of a portion of an automatic electric coffeemaker 10 which is of a type of coffeemaker well suited for use in restaurants. The coffeemaker 10 has an upper housing 11 which contains a typical siphon means for delivering hot water from a heated tank housed in a vertical lower housing 12. The front face of upper housing 11 comprises a control panel 13 for operating the coffeemaker 10 in a known fashion. On top of the upper housing 11 there are electrically operated warmers 14 for holding decanters of brewed coffeee to keep them warm between servings. A pair of parallel support channels 15 extend along opposite edges of th underside of the upper housing 11 for support of an improved brew chamber 16 shown in a preferred form of the invention. When a brewing cycle is initiated at the control panel 13, hot water is siphoned from the hot water tank and enters the brew chamber 16. Then, the water will saturate fresh ground coffee inside the brew chamber 16, as will hereinafter be described in greater detail, and thereafter hot brewed coffee drains from the brew chamber 16, shown by the arrow 17, for receipt by a decanter or the like which may be placed below.

With reference to FIGS. 2–4, it will be seen that the improved brew chamber 16 comprises a tapering sidewall 18 that terminates at a bottom wall 19. The bottom wall radially tapers to create a sump having a central outlet orifice 20 with a circumferential lip 21 therebelow. The brew chamber 16 includes a support flange, or rim, 22 extending outwardly from the top circumferential edge of the sidewall 18, which is supported generally at diametrically opposed locations thereon at the opposing channels 15.

The brew chamber 16 is formed to be capable of holding a filter paper 23 nested therein for receiving fresh ground coffee beans ready to be brewed. The filter paper 23 has a well-know frusto-conical design with a pleated sidewall.

In satisfying the goals of the invention, the improved brew chamber 16 is made of stainless steel which avoids the stain and odor problems of plastics, such as polypropylene. The stainless steel brew chamber 16 is not formed with integral bottom fins, as employed for molded plastics and in order to keep the filter paper 23 from sagging and clogging the orifice 20, the brew chamber 16 includes a unique filter support frame 24 which is also made from stainless steel wire. The filter support frame 24 serves as a means for spacing and supporting the filter paper above the bottom wall 19. By supporting the filter paper 23 on the support frame 24, the brewed coffee extracted from the fresh ground coffee beans may freely flow to the outlet orifice 20 below the filter paper 23. In order to securely hold the filter support frame 24 within the brew chamber 16, which is required when the filter paper 23 and used grounds must be emptied from the brew chamber 16, the filter support frame 24 is provided to have a discontinuous outer ring 25, best viewed in FIGS. 2 and 4. Extending radially inward from the discontinuous outer ring 25, there are five substantially identical V-loops 26 and a modified single V-loop 27. The six loops are evenly spaced and provide a generally symmetric arrangement as best viewed in FIG. 4. The loops 26 and 27 are attached to the outer ring 25 in a known manner, such as by spot-welding. Each of the loops 26 has radial legs 28 and 29, whch in the preferred embodiment include an angle therebetween of about 34°. The legs 28 and 29 of each loop 26 terminate generally near, but spaced from, the vertical axis of the brew chamber 16 in a curved return, or tip, 30. At the opposite outward ends of legs 28 and 29, there are bends 31 and 32 forming shorter legs 33 and 34 for each of the loops 26. The legs 33 and 34 are the portions attached to the discontinuous outer ring 25. The chorter legs 33 and 34 are angled upwardly substantially at the same angle as the taper of the sidewall 18.

As best viewed in FIG. 3, it will be seen that the legs 28 and 29 taper at a much shallower angle than the legs 33 and 34 toward the central vertical axis but stop generally short of a vertical zone, or column, above the outlet orifice 20. The filter paper 23 receives a sure support on the radial legs 28 and 29 and the curved tips 30, which reside below the bottom of the filter paper 23. Yet the support frame 24 provides sufficient pass-through area for the brewed coffee to flow generally unimpeded. The single loop 27 provides a unique gripping means providing a resilient operation that acts in cooperation with the discontinuous outer ring 25 so that the outer ring 25 may resiliently engage with an annular groove means of the sidewall 18 as will be explained below. The loop 27 includes radial legs 35 and 36 which taper downwardly toward the center of the brew chamber 16 at substantially the same angle as legs 28 and 29. The legs 35 and 36 terminate in a curved return, or tip, 27 substantially identical to the tips 30, as best viewed in FIG. 4. At the opposite ends of the legs 35 and 36, upward bends 38 and 39 form shorter legs 40 and 41 for attachment to the discontinuous outer ring 25. As would be clear, the legs 35 and 36 are substantially identical to the legs 33 and 34. Midway along the legs 35 and 36, the loop 27 has opposing inward bent finger grips 42 and 43 which have opposed convex configurations and thereby oppositely facing concave portions to allow a person's thumb and index finger to be placed therein for pinching the legs 35 and 36 toward each other.

The discontinuous outer ring 25 includes a gap 44 which defines an open space between the shorter legs 40 and 41 of the grip loop 27. Thus, the loop 27 will be understood as spanning the gap 44. Upon pinching at the finger grips 42 and 43, the legs 40 and 41 are also caused to move toward one another. In so doing the discontinuous outer ring 25 is forced to constrict to a smaller diameter. The tips 30 and the tip 37 accordingly move radially inwardly toward one another facilitating resilient attachment of the outer ring 25 to the sidewall 18, but they are sufficiently spaced so that the constriction of the outer ring 25 that is required for engagement with an annular groove 45 of the sidewall 18 does not cause the tips 30 or 37 to come into contact with each other and impede the resilient affixation. The attachment of the filter support frame 24 to the sidewall 18 of the brew chamber 16 is achieved by the provision of said annular groove 45, which is formed in the sidewall 18 of the brew chamber 16. The diameter of the annular groove 45 is slightly smaller than the at-rest, or relaxed, diameter of the discontinuous outer ring 25 so that the support frame 24 may be resiliently held. The diameter of the annular groove 45 is, of course, larger than a constricted diameter of support frame 24 when a person exerts pinching force at the finger grips 42 and 43 during engagement. When the pinch grip is released the outer ring 25 resiliently enlarges against the annular groove 45 in a spring-tensed tight fit so that the filter support frame 24 can not accidentally be dropped from the brew chamber 16, such as during the emptying of used coffee grounds.

In the exemplary embodiment the filter support frame 24 is comprised of stainless steel wire having a diameter of 0.091 inches and a relaxed outer diameter of 53/16 inches. The diameter of the annular groove 45 in the preferred embodiment is 5.122 inches and the annular groove has a radius of 3/64 inches. The taper of the sidewalls 18 is about 74° from horizontal and the slope of the bottom wall 19, best viewed in FIG. 3, is about 12°. The shorter legs of the loops of the filter support frame 24 slope downwardly substantially at about the same angle as the sidewall 18 and in the preferred embodiment slope at about 72° from horizontal. The longer legs of the loops slope downwardly toward the central vertical axis at about 5°. The bottom wall slope of th brew chamber 16 therefore is in the exemplary embodiment somewhat more steeply tapered to the sump.

The disclosed embodiment of the brew chamber 16 has a sidewall and bottom wall thickness of 0.035 inches and, like the wire used for the support frame 24, is made from Type 304 stainless steel.

These foregoing dimensions are provided for the purpose of describing an exemplary embodiment and are not to be construed as limitations to the wide range of equivalents the invention encompasses.

For the purposes of protecting the lip 21 of the outlet orifice 20, a plurality of support feet 46 may be provided. Thereby, when the brew chamber 16 is placed on a table, or counter top surface, during the insertion of a new filter paper and fresh coffee grounds, the lip 21 is safely spaced thereabove and can not accidentally become deformed by contact with the supporting surface. As would be clear to one skilled in the art, the desired smooth stream flow characteristics of the flow of brewed coffee from the brew chamber 16 depends upon preserving the diameter of the outlet orifice 20 and nozzle function created by the lip 21. In the preferred embodiment, the brew chamber 16 is provided with three support feet 46 which are radially arranged and spot-welded in place. The feet 46 are generally wedge-shaped to conform to the slope of the bottom wall 19 so that the brew chamber 16 may set level on a flat support surface.

A handle 47 may be attached to the brew chamber 16 such as by mechanical fastening, welding, or the like, and preferably is made from a material that does not readily conduct heat. It is beneficial to make the handle 47 from a non-heat conductive material, so that the hot brew chamber 16 may be taken from the coffeemaker 10 immediately after a batch of coffee has been brewed, at which point the brew chamber 16 would still be too hot to be touched.

It is envisioned that a wide range of equivalents fall within the scope of the claims appended hereto. The foregoing description of the preferred embodiment is made for purposes of explaining the practice of the invention and without limitation to the claims.

What is claimed is:

1. In a coffee making device of the type in which hot brewing water is directed from a source of hot water to be dispensed into a brew chamber holding fresh ground coffee therein, an improved brew chamber assembly comprising:

a stainless steel brew chamber having a sidewall, the sidewall tapering downwardly to a bottom wall, the bottom wall having a sump and means defining an outlet orifice therethrough said outlet orifice communicating with said sump, the sidewall having an upper circumferential edge, means extending from said circumferential edge for supportive engagement with support means on said coffeemaker, said sidewall further including means defining an annular groove;

support frame means having an outer ring being engagable with said annular groove of the brew chamber, said ring being discontinuous to define a gap therealong, a plurality of loop means extending inwardly from said ring, one said loop means extending from the ring at either side of said gap to span the gap, said loop means extending inwardly of said brew chamber to define a frame spaced above the bottom wall of the brew chamber for supporting a filter paper thereon, the one said loop means spanning the ring gap is capable of being manually pinched to resiliently constrict the diameter of the ring facilitating engagement with said annular groove of said brew chamber;

wherein said support frame means provides for supporting and spacing a filter paper above the bottom wall of said brew chamber whereby brewed coffee may be extracted from coffee grounds placed within said filter paper when immersed with said hot brewing water to flow through said filter paper past said support frame means to the outlet orifice whereby said filter paper is prevented from clogging said outlet orifice to provide an even flow of coffee from the brew chamber.

2. The improvement as is in claim 1 wherein said support frame means comprises stainless steel.

3. The improvement as in claim 2 wherein said loop means each have two radial legs defining equal angles there between.

4. The improvement as in claim 3 wherein the legs of each loop are integrally joined at curved tips at inward ends thereof and terminate at shorter legs at outward ends thereof, said shorter legs being joined to the discontinuous ring.

5. The improvement as in claim 2 wherein said one loop means spanning the gap of said discontinuous ring includes a pair of inwardly directed leg means integrally joined at inward ends thereof and terminate at shorter legs at outward ends thereof, the shorter legs being joined to said discontinuous ring at opposite sides of said gap.

6. The improvement as in claim 5 wherein the inwardly directed leg means each include finger grip means comprising oppositely directed curved portions whereby they may be manually gripped by a person's fingers for the resilient constricting of the diameter of said discontinuous ring.

7. The improvement as in claim 1 wherein said means defining said outlet orifice includes circumferential lip means depending downwardly from said bottom wall of the brew chamber through which the stream of brewed coffee is directed.

8. The improvement as in claim 1 wherein said bottom wall of the brew chamber radially tapers to a central sump.

9. The improvement as in claim 1 wherein said means for supportive engagement with the support means of said coffeemaker comprises an outwardly directed flange extending from said upper edge of said sidewall and wherein said coffeemaker support means is of the type having opposing channels capable of receipt therein of said flange at substantially diametrically opposed locations thereon.

10. The improvement as in claim 1 wherein said brew chamber includes support feet means extending downwardly from the underside of said bottom wall.

11. The improvement as in claim 1 wherein said brew chamber includes handle means attached to the outer side of the sidewall of the brew chamber.

12. The brew chamber for holding filter paper and fresh coffee grounds therein for the receipt of hot brewing water for brewing said coffee grounds and draining brewed coffee into a decanter, the brew chamber comprising a stainless-type steel and having an integrally formed sidewall and bottom wall, said sidewall downwardly tapering to said bottom wall and the brew chamber sidewall terminating at an upper circumferential edge, the brew chamber also having an open top defined therearound by said upper circumferential edge wherein the bottom wall has a smaller diameter than said open top, said sidewall including support means extending outwardly from said upper edge for engagement with support means of a coffeemaker, said bottom wall sloping to a sump, means defining an outlet orifice from said sump, and means defining an angular groove around said sidewall generally closer to said bottom wall than to said open top, spacer means engagable with said annular groove means and including a discontinuous outer ring means defining a gap therealong and having a plurality of radially directed loop means attached to said outer ring means, wherein one said loop means attaches at opposite sides of said gap and spans the gap, said spanning loop means capable of being pinched from opposite sides thereof to constrict the diameter of said discontinuous outer ring, the diameter of said outer ring being slightly larger than the diameter of said annular groove means whereby to facilitate resilient engagement therein, the spacer means capable of supporting a filter paper thereon without clogging or sagging in order that brewed coff extracted from said fresh ground coffee may freely flow into a region between said spacer means and said bottom wall to achieve an even flow through said outlet orifice.

13. A brew chamber as in claim 12 wherein said spacer means comprises stainless steel.

14. A brew chamber as in claim 12 having support leg means extending downwardly from an underside of said bottom wall.

15. A brew chamber as in claim 14 wherein said means defining said outlet orifice further includes lip means depending downwardly therefrom facilitating smooth even flow of brewed coffee through said outlet orifice.

16. The brew chamber as in claim 12 wherein the loop means of said spacer means comprise V-shaped wire loops having long legs extending inwardly and terminating in an integrally formed curved tip, the long legs sloping upwardly therefrom to terminate in bend portions generally below said discontinuous ring, the V-shaped wire loops including shorter upwardly extending legs extending from said bend portions, said shorter legs being affixed to said discontinuous outer ring means, and wherein said one loop means spanning said gap having said shorter legs attached at opposite sides of the gap in the discontinuous outer ring means to achieve said spanning.

17. In combination:
an electric coffeemaker having an upper housing including siphon means for directing hot water outwardly therefrom and support means for supporting a brew chamber therebelow;
a brew chamber having support frame means therein, said brew chamber and support frame means comprising stainless steel, the brew chamber having sidewall and bottom wall means, and means defining an outlet drain orifice through the bottom wall means, said support frame means being engagable to said brew chamber whereby to be tightly and removably held in place, said support frame means including means for resiliently engaging said brew chamber and said brew chamber including cooperative engageable means for resiliently engaging the support frame means and inwardly directed support means forming a support for filter paper;
filter paper resting atop the support means of said support frame means within said brew chamber and being spaced above the bottom wall of said brew chamber, whereby upon receiving a batch of fresh ground coffee and the introduction of hot brewing water from said coffeemaker, said coffee is extracted therefrom and passes through said filter paper into a region of said brew chamber below said support means of the support frame means and outwardly thereof through said outlet drain orifice and wherein said filter paper is prevented from sagging downwardly to clog said flow.

18. The combination as in claim 17 wherein said brew chamber includes outwardly extending flange means extending outwardly from a top edge of said sidewall means and capable of supportive engagement at the upper housing support means for supporting a brew chamber.

19. The combination as in claim 17 wherein said support frame means includes an outer discontinuous ring means supporting said inwardly directed support means and resilient finger grip means forming a portion of said support means, wherein said discontinuous ring means is capable of being reduced in diameter at said resilient finger grip means, and wherein said sidewall means of said brew chamber includes a groove means for receiving said discontinuous ring means in resilient spring-type engagement therewith.

20. The combination as in claim 17 wherein said brew chamber includes support feet means attached to the underside of said bottom wall means and extending therefrom a sufficient distance whereby the brew chamber may be supported on a level surface with said outlet orifice spaced from said support surface whereby to prevent contact therewith.

* * * * *